United States Patent Office 3,088,799
Patented May 7, 1963

3,088,799
METAL EXTRACTION PROCESS
Charles A. Fetscher, Short Hills, N.J., assignor to Nopco Chemical Company, Harrison, N.J., a corporation of New Jersey
No Drawing. Filed May 25, 1959, Ser. No. 815,246
14 Claims. (Cl. 23—14.5)

The present invention relates to a particular class of solid chelating agents and their use in the selective extraction of a particular class of heavy metals from solutions. More particularly, the present invention pertains to a novel and superior process of selectively extracting heavy metals from solutions containing same by means of high molecular weight organic polymers referred to hereinafter as polyamidoximes.

The problem of selectively extracting as well as recovering heavy metal ions is of extreme importance. For instance, in the matter of river pollution by industrial wastes, due to public and governmental pressure, industries must remove toxic waste components from plant effluents. Among the important problems are toxic concentrations of heavy metals such as copper. Moreover, due to increased use of fissionable materials, increased quantities of highly dangerous radioactive materials are created which must be completely recovered for special disposal. Some of these dangerous radioactive species are heavy metal cations.

In many instances, besides the problem of removing metals from industrial wastes prior to disposal, these same metals are undesirable during the operations per se. Some metallic contaminants interfere in flotation processes and must be removed or deactivated. Metals, particularly copper and iron, are undesirable in steam generators, condensers and other equipment through which water is passed. Many processes such as textile dyeing, paper making, etc., require careful regulation and protection against metal contaminants. The deactivation of metallic contamination which would interfere with the process contemplated is the only important commercial use of chelating agents today.

In many industrial processes, loss of metals represents a large economic loss. For instance, non-recovery or insufficient recovery of precious metals from plating baths adds greatly to cost. Similarly, in precious metal refining per se, it is extremely desirable to cut down loss of metal through refinery wastes. In fact, in any refining process, recovery of metals from mill effluents and other aqueous wastes would greatly reduce overall cost of operation. In most flotation processes, dissolved metallic values represent a loss. The heavy metal ores are very limitedly soluble in water and dissolved concentrations in the tailings water will seldom exceed possibly 100 p.p.m. No process of the prior art has been able to economically recover heavy metals from such low concentrations in solutions which are also normally rich in sodium and calcium. Although the concentration of the valuable metal in the tailings water will be very low, the volume of water used by even a small flotation mill is enormous and the total metal value lost is important.

In the recovery of uranium, the problem is very important. Uranium is relatively valuable, it is found in relatively low concentrations and its salts are fairly soluble. A very considerable percent of the uranium is lost in the tailings of an ore beneficiation plant. My process, when applied to uranium removal, will substantially prevent this loss.

Many innovations have been introduced and tried in order to increase the recovery of heavy metals particularly from dilute aqueous media and have met with varying degrees of success. For instance, ion exchange resins have been used to remove cations from solution by exchanging them for existing cations of the resin. The rate of flow through a resin column is very slow thereby adding to the time required for removal of the metal. Moreover, the capacities of these resins are quite limited, i.e., of the order of 5 to 20% of the resin weight. The ion-exchange resins are not at all selective, for the most part they pick up the ion of the greatest concentration at a given valence level. In fact, they are useless for the removal of metals present in hard water or present in solutions of strong salts.

Thus, to selectively extract one ion from a solution containing several is a very desirable operation and one that has been very difficult to achieve.

Accordingly, it is an object of the present invention to selectively remove and recover in a novel manner substantially all of one, several or all of a selected group of heavy metal ions which are present in solutions containing the same plus other non-recoverable ions.

Another object is to selectively remove and recover substantially all of one or several of a selected group of heavy metal ions from solutions containing mixtures of heavy metal ions, all of said metals being capable of recovery.

A further object is to provide for a continuous process for extracting one or a mixture of a selected group of heavy metal ions from solutions containing same which solutions also contain other non-recoverable ions as well as to provide for a continuous process for extracting one or several of a selected group of heavy metal ions from solutions containing a mixture of heavy metal ions, all of said metals being capable of recovery.

Another object is to selectively remove and recover said heavy metal ions when they are present in minute quantities, i.e., of the order of 10 to $10^{-4}$ p.p.m. in solution in an economical and substantially complete manner.

Still another object is to selectively remove and recover said heavy metal ions from non-aqueous solutions.

A still further object is to substantially completely elute from a class of materials chelated with a mixture of said selected group of heavy metal ions, one or several of said mixture of heavy metal ions.

Other objects are to provide for selective extraction and elution processes making use of a relatively inexpensive solid chelating agent that is easy to adapt to a variety of processes and in which said agent is normally capable of giving up the removed metallic ions for their recovery and capable of being regenerated in a direct manner.

Other objects will become apparent from the detailed description given herein. It is intended, however, that the detailed description and specific examples do not limit the invention, but merely indicate preferred embodiments thereof since various changes and modifications within the scope of the invention will become apparent to those skilled in the art.

I have discovered that solid polyamidoximes are very selective chelating agents. They will form complexes with a selected group of heavy metals of atomic weight greater than about 50 selected from the periodic chart of the elements while they do not form complexes with other metals such as lighter metals as sodium, calcium and aluminum. This selectivity is demonstrated when an extraction is carried out upon a solution containing mixtures of both the above heavy metal ions and the common lighter ions. Moreover, I have also discovered that I am able to selectively extract one or several heavy metals from a solution containing a mixture of heavy metal ions all of which are capable of recovery. Furthermore, having extracted a mixture of said heavy metal ions, I may also selectively elute from the complex, one or several of said ions.

These discoveries can be accomplished by bringing solutions containing heavy metal ions as described above into contact with a solid chelating agent comprising a high molecular weight organic polymer containing amidoxime substituents, referred to as hereinafter as a polyamidoxime. Substantially complete removal of the desired metal ion or ions from the liquid media is accomplished by such a procedure while other ions, even those which are capable of removal by my process are unaffected. During contact between the solution and the chelating agent, the amidoxime groups and the metal ions react to form a complex thereby withdrawing the ions from solution. The ions can be removed from the complex and recovered if desired. Also, in most instances, the chelating agent is simultaneously regenerated during the removal of the cations. In my process, the solid chelating agents, as will be demonstrated hereinafter, do not merely deactivate the metal, they selectively remove it, thus both the metal and the chelating agent are recovered and the chelating agent can be reused again and again. The soluble chelating agents of commerce, e.g., ethylene diamine tetra acetic acid and its analogues would be extremely difficult to recover and are seldom, if ever, reused.

Amidoximes as chemical entities have long been known. Ley and Krafft, Berichte 40, 697 (1907), mention the colored inner salts formed by relatively simple amidoximes and a few cations; however, they have been studied very little. Probably because of the similarity of their structure to the very unstable amidines (amidoximes are also called hydroxyamidines), the belief that they are quite unstable persists (see Sidgwick, Organic Chemistry of Nitrogen, 1937, p. 201). Contrary to such prior belief, polyamidoximes are quite stable, i.e., they are not hydrolyzed or decomposed by cold dilute acid or alkali (from pH below 1 to about 13) in any reasonable time.

I use the expression "solid chelating agents" to mean chelating agents which function without being dissolved. The fact that these polyamidoximes or any such solid chelating agent is able to extract from a solution and form extremely stable complexes with particular heavy metals is distinctly surprising. Solid chelating agents have been little studied or considered by experts in this field of chemistry because they appear to have considerable handicap. They cannot saturate the coordination sphere of a heavy metal because of their limited mobility, although it may happen to a limited degree under some special conditions. The reason is that most heavy metals show coordination numbers of six, a few have values of four and a few have eight. Considering coordination numbers of six as typical and realizing that the values of four and eight represent only differences in degree, three bidentate chelating entities are required to fill the coordination sphere of the heavy metal ion. The amidoxime moiety per se is bidentate although, of course, the polymer molecule as a whole is multidentate. However, the chelating groups on the polymer are randomly separated, and it is most improbable that the relatively rigid molecules of the solid can curl and encompass the metallic ion in order to saturate all of its coordination sphere. Thus, solid bidentate chelating agents can in general occupy only two sites in the coordination sphere of the metal ion. It is true that unsaturated complexes are known; however, they are generally assumed to be considerably less stable than complexes in which one or several molecules of the chelating agent completely saturate the coordination sphere of the metal ion and which saturation tends to form whenever possible. Hence, it is surprising that these solid polyamidoximes, which incompletely saturate the coordination sphere of the metal, form such stable complexes with them. The stability of these complexes is demonstrated by their formation at very low pH, the inability to disrupt the gold, platinum and palladium complexes with concentrated mineral acids, the formation of these complexes at the expense of other complexes, and the formation from amazingly low concentrations of the metal ion.

It have discovered that the polyvalent metals which may be selectively removed and recovered from solutions containing same are a number of those ions of heavy metals of atomic weight above about 50 which are set forth in the periodic chart of the elements. The solid polyamidoximes are particularly effective with polyvalent heavy metals which form colored ions in solution. Furthermore, I have discovered that solid polyamidoximes complex with and extract the metal ions from very dilute solutions, e.g., as low as concentrations of $10^{-5}$ to $10^{-10}$.

Table I lists the metals set forth in the periodic chart of the elements along with their approximate pH values for their extraction which I have found may be selectively extracted and recovered, i.e., one or several, from solutions containing same. I do not specify a maximum pH limit since extraction may be accomplished under alkaline conditions so long as the ion remains in solution. In the case of gold, this would allow for extraction up to a pH of about 7 since at high pH's the gold will normally precipitate out of solution. If there are present in solution two or more metals which are capable of removal and if only one is to be removed, the pH of the metal to be removed must be at or above the pH given in Table I as well as below the minimum pH of the metal remaining behind. Also, one or several of these metals may be eluted or freed from the polyamidoxime which has been chelated with several of the metals. Of course, if a polyamidoxime which is chelated is to be eluted, then these same pH values are controlling, i.e., they represent, with the exception of the noble metals, an approximate value at which the particular metal may be separated from its complex. However, in practice it is preferable to elute at a pH appreciably below the minimum pH value for chelation. Table I discloses the metals for selective extraction and selective elution (except, of course, the noble metals). However, it is understood that these metals when in their polyvalent states may exist in several ionic forms, of which, the following are exemplary:

Simplex cation _____ $Cu^{+2}$.
Complex cation _____ $UO_2^{+2}$.
Complex anion _____ $AuCl_4^{-1}$; $PdCl_4^{-2}$; $PtCl_6^{-4}$; $RuCl^{-2}$; $[UO_2(NO_3)_3]^{-1}$; $[UO_2(CH_3COO)_3]^{-1}$.
Hydrated or ammoniated ion _____ $Cu(NH_3)_4^{+2}$.

TABLE I

| Metal: | pH (minimum value for extraction: maximum value for elution) |
| --- | --- |
| Plutonium | <1 |
| Gold | <1 |
| Platinum | <1 |
| Palladium | <1 |
| Rhodium | About 1.0 |
| Iron | About 1.5 |
| Thallium | About 1.5 |
| Vanadium | About 1.5 |
| Uranium | About 2.0 |
| Ruthenium | About 2.0 |
| Copper | About 3.5 |
| Nickel | About 4.0 |
| Cobalt | About 4.0 |
| Chromium | About 4.0 |

By the pH "<1" is meant acidic pH's which are below a pH of 1 and which are usually not accurately measurable on pH indicators which generally are accurate down to a pH of about 1.

In the case of complex ions, it is probable that in most instances only the metallic element is incorporated in the amidoxime complex and that the dissociation equilibrium of the complex ion supplies enough of the simple cation to exceed the concentration in equilibrium with the amidoxime. Thus, I believe, the equilibrium

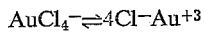

is far to the left normally but the tiny concentration of cationic gold is more than can exist in equilibrium with the amidoxime. It is therefore consumed and the dissociation of the chlorauric ion goes to completion. Whatever the mechanism, I can selectively extract these metals equally well from solutions in which they are part of complex anions or complex cations or from solutions in which they are simple cations. In fact, I have found that solid polyamidoximes selectively recover uranium about as well from solutions rich in sulfate ion in which the uranium is present as the anionic complex

as from solutions of uranyl acetate wherein uranium is presumably present as the uranyl ion, $UO_2^{+2}$. Polyamidoximes also extract uranium from strong sodium carbonate solutions wherein the uranium is complexed with carbonate. Such solutions are frequently used to remove uranium from ion-exchange resins.

Furthermore, I have found that the metals of Table I may be selectively extracted singly or together from the remaining metals of the periodic chart of the elements. The following is a list of some of the metals which when in solution as ions do not form complexes with solid polyamidoximes. This list is exemplary of the remaining metals (including amphoteric metals) which are set forth in the periodic chart of the elements and which are non-chelatable with solid polyamidoximes.

| | |
|---|---|
| Aluminum | Magnesium |
| Antimony | Manganese |
| Arsenic | Mercury |
| Barium | Neodymium |
| Beryllium | Potassium |
| Bismuth | Praseodymium |
| Boron | Rubidium |
| Cadmium | Samarium |
| Calcium | Silver |
| Cerium | Sodium |
| Cesium | Strontium |
| Dysprosium | Terbium |
| Erbium | Thorium |
| Europium | Thulium |
| Gadolinium | Tin |
| Hafnium | Titanium |
| Holmium | Tungsten |
| Lanthanum | Ytterbium |
| Lead | Yttrium |
| Lithium | Zinc |
| Lutetium | Zirconium |

Thus, any of the metals appearing in Table I when in solution either alone or in admixture with each other may be readily separated as a group or from each other when in the presence of one or more of the remaining metals of the periodic chart of the elements which I have found do not complex with the solid polyamidoximes. While it is possible that some of these remaining metals in the periodic chart of the elements, i.e., other than those metals set forth in Table I, when in an uncommon state or over a narrow pH range may complex with a solid polyamidoxime, such chelation has not been observed under the wide range of conditions which I have tried. Hence, these remaining metals of the periodic chart of the elements can be considered non-chelatable in general. However, the fact that not all metals, in fact, not even all heavy metals are extracted by my process is itself a very advantageous feature of my process. For instance, this makes possible valuable separations and purifications such as gold from lead or iron from barium which are normally very difficult to achieve.

Thus, in view of the history of amidoxime complexes and in view of the fact that only partial saturation of the coordination spheres of certain ions with the solid polyamidoximes is achieved, my discovery of the selective extraction and elution under specified conditions of pH was most unexpected. Ordinarily no extraction would be expected, i.e., no chelation would be expected due to the incomplete saturation of the coordination spheres of the metals or due to interference by one ion with another. Also, possibly, one would expect solid polyamidoximes to behave as ion exchangers and chelate any ion of the proper charge but never as a selective chelating agent because a chelating agent normally encloses the metal ion, i.e., the metal is nested within the functioning groups of one or several of the chelating molecules. Hence, the size and character of the ion are critical and the chelating agent is specific to a limited number of ions. But as explained previously, the solid polyamidoximes cannot encircle the ion and thus it would be expected to accept indiscriminately any ion of the proper charge as in the case of ion exchangers.

Indeed, the list of metal ions of Table I which may be selectively extracted from each other and from those remaining metals of the periodic chart of the elements elicits no basis for predicting the success of the present invention. I am aware of prior work set forth in Belgian Patent No. 541,496 in which a polyamidoxime was treated with a warm dilute ferric chloride solution thereby removing the ferric ions from the solution (Example 18). However, even from a study of this procedure, my discovery of selective extraction of one or several ions from a plurality thereof was not at all obvious.

GENERAL CONSIDERATIONS OF SELECTIVE EXTRACTION AND RECOVERY

As stated before, I have discovered that the various metals listed in Table I, when in solution in the form of cations or complex cations or complex anions will form complexes with the solid polyamidoximes which vary in their stability to acids. It is this difference in the stability of the various complexes which makes it possible to separate the various metals of Table I when in solution from each other and from solutions also containing the remaining metals of the periodic chart of the elements when also in solution.

In general, the metals in the solution are ascertained along with the metals, one or several, which are to be removed. The pH of the solution is also ascertained and adjusted, if necessary, so that it is not less than or preferably above, the value set forth in Table I for the particular metal to be removed. In this manner, one or several metals may be removed, i.e., all metals of Table I which are present in solution and whose minimum pH's for extraction lie at or below the pH of the solution. If one of several metals is to be removed, then as stated before, the pH of the solution must be at or above the minimum pH of the metal to be removed as set forth in Table I as well as below the minimum pH of the metal remaining behind. When a noble metal is present, it will be extracted at any pH since the minimum value for extraction is <1. Where solutions contain metals other than those set forth in Table I, the pH as regards these need not be taken into account since they are not chelated. In other words, the pH considerations are directed to the optimum values for removing the metal or metals of Table I which may be present. Of course, if the pH is too high, the non-chelatable metals may precipitate out of solution thereby promoting the possibility of occlusion in the polyamidoxime which is not desired.

When a polyamidoxime is treated with acid so that the metal may be recovered and the polyamidoxime is regenerated, the pH should be below the pH value set forth in Table I for the metal. If one of several metals is to be freed from its complex with the polyamidoxime, the pH for the metal to be freed should be below the value set forth in Table I as well as above the values set forth in Table I for the metals which are not freed from the complex. As pointed out previously, the noble metals are not eluted from their complex with the polyamidoxime by acid treatment.

For example, the solid polyamidoximes can separate the noble metals, i.e., gold, platinum and palladium, when in solution from all other metals which are also present in solution by forming chelates with their ions in the presence of strongly acid solutions. Under such strongly acid conditions, i.e., at a pH below 1, the remaining metal ions of Table I as well as the remaining ions of the periodic chart of the elements will not form a complex with the solid polyamidoxime. Again, at any higher pH, gold, platinum and palladium as well as a number of the other metals in Table I when in solution will complex with the polyamidoxime so long as the pH of the solution is above the minimum value set forth for the metal (other than the noble metals) in Table I. In this instance, if desired, these other metals can be stripped from the polyamidoxime complex by use of a strong mineral acid, e.g., a 5% by weight aqueous solution of hydrochloric acid. The noble metals are not removed by the acid, but remain complexed with the polyamidoxime thereby becoming separated from the other ions by a process of elution. The gold, however, may be released by treatment with sodium or potassium cyanide or thiourea in strong acid solution. Although platinum and palladium cannot be eluted from their chelate with the solid polyamidoxime, they still may be advantageously recovered from solutions by formation of the chelate complex. In view of their high monetary worth, the destruction of the polyamidoxime to recover these metals is justified.

Similarly, iron can be separated from all other common metals. Its complex with the polyamidoxime is formed above about pH 1.5 and it is well extracted between about 1.5 to 2.0. Only iron and the noble metals will form a complex in this pH range. Iron is then removed from the polyamidoxime by treatment with a 5% HCl or similar acid solution. An important and completely feasible separation is iron from uranium. Although the solid polyamidoxime chelate uranium very well, the uranium complex is not formed below a pH about two. Similarly iron is readily and essentially quantitatively separated from copper if the pH of the feed solution is maintained between about 1.5 and about 3.5 since copper does not chelate appreciably below about pH 3.5.

For purposes of regulating pH, both during selective extraction and subsequent elution, I may use any organic or inorganic acid with or without a buffer in order to achieve the desired pH. The acids may be added per se, or as an aqueous solution thereof. Convenient acids are hydrochloric acid, sulfuric acid, formic, oxalic, etc. It is, of course, understood that other acids may be used and their selection is obvious to one skilled in the art. If an extraction is carried out in which one ion is removed at a very low pH and subsequently a virgin polyamidoxime is introduced at a higher pH to remove another ion, then any convenient base, organic or inorganic, may be introduced to raise the pH, e.g., sodium hydroxide and potassium hydroxide and other common alkalis, the selection of which is obvious to one skilled in the art.

The manipulation of the pH of the solution in order to carry out the selective extraction is, of course, within the skill of the art. In fact, in many instances due to the inherent pH of the solution, it may not be necessary to manually adjust the pH of the solution before bringing it into contact with a solid polyamidoxime if the pH is at or above the value set forth for the metal in Table I.

Thus, I have discovered that the solid polyamidoximes offer an outstanding means to accomplish these separations. They are far more selective than are ion exchange resins and far more useful and economical in operation than either water soluble or oil soluble chelating agents. Water soluble chelating agents are obviously useless for the recovery or removal of metals from aqueous solutions since no economical separation from the water is possible. Oil soluble chelating agents do function, but the separation of two liquid layers, especially in the presence of the soap like polar-nonpolar complex which is formed is far more complicated and troublesome than filtering out a granular resin or lifting out of solution a fibrous polyamidoxime. There is also a very considerable difference in potential capacity. A chelating group is, of course, polar and to make the molecule oil soluble, the chelating group is attached to and diluted by a large oil solubilizing radical. This means that oil soluble chelators necessarily have low capacity based upon weight. The resinous or fibrous chelators described herein do not need this dilution and therefore can have very high capacity compared to these oil soluble chelators.

Moreover, most of the heavy metal ions considered herein have a coordination number of six and therefore will combine with three bidentate chelate groups when possible as in the case of a water or oil soluble chelating agent which is highly mobile. Hence, this factor contributes to a low capacity due to the fait accompli of complete saturation with these soluble chelators. On the other hand, the solid polyamidoximes chelators can only and essentially do form only a one to one complex with the heavy metal ion as described previously herein. Hence, even considering an equal number of identical bidentate chelating groups, the solid polyamidoximes have three times the capacity of an oil or water soluble chelator of the same functional group for an ion having a coordination number of six. Furthermore, by their very nature, i.e., their viscosity, their emulsifying tendencies and their cost, oil soluble chelators are used in dilute oil solutions containing 1% to 5% by weight of active material. The solid chelator of my process is used as is, i.e., 100% active.

PREPARATION OF THE CHELATING AGENTS

The polyamidoximes of the present invention may be prepared in a direct and economical manner. Their preparation is based upon the reaction of a nitrile containing polymer with hydroxylamine at temperatures of between 0 and 100° C. for from about ¼ to 40 hours, in a solvent for hydroxylamine. Solvents such as water and alcohols, e.g., methanol, ethanol or propanol, are satisfactory. As is well known in the art, hydroxylamine is commercially available only in the form of its salts such as hydroxylamine sulfate and hydroxylamine hydrochloride. Hence, it is necessary to neutralize a solution of the salt to a pH of about 7.5 in order to utilize the free base. It is only the free base which reacts with the nitrile substituents.

There are a great many types of nitrile containing resins or polymers which can be used in the present invention to serve as starting materials for the preparation of the polyamidoximes. For example, the largest and most economically feasible group comprises the homopolymer and copolymers of acrylonitrile. In the copolymers, the comonomer may be one or more of the common copolymerizable monomers such as styrene, butadiene, vinyl chloride, vinyl acetate etc., including all the monomers which will copolymerize with acrylonitrile. A representative list appears on page 50 of the book, "The Chemistry of Acrylonitrile," by the American Cyanamid Company (1951). The nitrile content essential for the formation of the solid polyamidoximes of this process can arise from other sources beside acrylonitrile. Vinyl polymers containing alpha-methacrylonitrile, alpha-ethacrylonitrile, fumaryl dinitrile or vinylidene cyanide or the like are perfectly satisfactory. It is only necessary that the polymer be water insoluble. It is preferred that the polymer contain at least about 10% by weight of nitrile for optimum effectiveness. Note that 10% by weight of nitrile (CN) is about 20% by weight of nitrile calculated as acrylonitrile. This means that in the copolymers of acrylonitrile, the non-nitrile comonomers, one or several, can total as much as 80% by weight of the final resin weight. Since the homopolymer is completely satisfactory, the comonomer content obviously can be zero. Thus, the composition of the resinous nitrile substrate can be from about 20% to 100% by weight of acrylonitrile or an equivalent weight of another nitrile containing monomer, e.g., alpha-methacrylonitrile and 80% to 0% of one or more comonomers. By "copolymer" I mean polymers obtained from the polymerization of acrylonitrile or other nitrile containing monomers with at least one other monomer copolymerizable therewith. Depending upon the process of polymerization, the copolymer may be characterized as a random, alternating, graft or block copolymer. The term polymer as used herein includes both homopolymers and copolymers.

In general, the molecular weight of the polymers from which the polyamidoxime is prepared is in no way critical. They merely have to be high enough in molecular weight to be substantially insoluble in water and there is no upper limit. The commercially available acrylonitrile homopolymers and copolymers are all completely satisfactory. For the fibrous products the molecular weight should lie between about 40,000 and 150,000. To carry out my process, I prefer to use preformed fibers in the form of commercially available synthetic textile materials containing these fibers in their woven or non-woven form.

An additional type of nitrile containing polymer is the natural or synthetic polymer to which acrylonitrile has been added as a side chain on the polymer. Cyanoethylated cellulose as cyanoethylated cotton or cyanoethylated viscose rayon or cyanoethylated insolubilized polyvinyl alcohol are all perfectly satisfactory for the preparation of the solid polyamidoximes provided that the cyanoethylation is carried out to the extent of at least about 20% by weight of the polymer calculated as acrylonitrile (10% by weight of nitrile calculated as "CN"). As is obvious to one skilled in the art, the substrate for the cyanoethylation need not be pure cellulose or pure polyvinyl alcohol. The cellulose can be partially esterified or the like, the polyvinyl alcohol may contain some polyvinyl acetate or other extraneous unit in its structure. In fact, the polyvinyl alcohol must be insolubilized before cyanoethylation to be useful in this process. This is easily accomplished by treatment with formaldehyde or glyoxal or by vigorous heat treatment. It is only necessary that the resin retain enough active hydroxyl sites to permit cyanoethylation to the degree cited. With these materials I prefer also to use preformed fibers, that is, the commercially available natural or synthetic textile materials in either woven or non-woven form.

As my examples demonstrate, only a partial conversion of the nitrile groups of nitrile containing polymers to amidoxime groups will occur. It must be appreciated that not all of the nitrile substituents can be converted to amidoxime substituents. The nitrile substituents present in the inner portions of the resin are not exposed to the hydroxylamine reactant. The extent of this conversion as indicated by the quantity of hydroxyamine consumed appears to range from about 20% to about 75%. Closed systems were used to preclude the loss of hydroxylamine and thus the hydroxylamine consumed is a fair measure of the extent of reaction. This means that a 100% polyacrylonitrile resin is converted to a polyamidoxime containing from about 19.8% to 57% by weight of amidoxime substituent,

calculated as such, based upon the total weight of the resin. However, in experiments with cyanoethylated cotton showing a nitrogen content of only 5% (10% by weight of CN, or 20% by weight as acrylonitrile), in some instances the conversion was as low as 40% and the cotton amidoxime was a perfectly operable fibrous chelator with adequate capacity for metals. This corresponds to an amidoxime content of about 8.5% by weight of the polymer. This appears to be quite low but it is fairly certain from steric and spatial considerations which have been previously alluded to that there is little possibility for the chelating agent to completely satisfy the coordination number of the metal. Instead of associating with three amidoxime entities the metal can only approach one, or at most and only to a slight extent, two. This actually is a more economical utilization of the chelating function and makes these low concentration amidoximes perfectly operable and useful. The following table shows how the metal capacity increases with amidoxime content assuming a one to one interaction. It is obvious that even polyamidoximes of very low amidoxime content chelate appreciable quantities of heavy metals. There is, of course, no lower limit. As long as the resin contains some amidoxime, it has some chelating capacity.

CALCULATED METAL CAPACITY OF A POLYAMIDOXIME AS A FUNCTION OF THE AMIDOXIME CONTENT ASSUMING A ONE TO ONE COMPLEX

| Percent by weight of amidoxime | Mol. weight of polymer per amidoxime substituent | Capacity, as percent of resin weight | |
|---|---|---|---|
| | | Gold | Uranium |
| 1 | 5,900 | 3.4 | 4.0 |
| 2 | 2,950 | 6.7 | 8.0 |
| 5 | 1,180 | 16.7 | 20.2 |
| 10 | 590 | 33.5 | 40.4 |
| 15 | 393 | 50.0 | 60.7 |
| 20 | 295 | 67.0 | 80.0 |
| 25 | 236 | 83.5 | 100.0 |
| 30 | 196 | 100.0 | 121.0 |
| 35 | 169 | 117.0 | 141.0 |
| 40 | 147 | 134.0 | 162.0 |
| 45 | 131 | 150.0 | 182.0 |
| 50 | 118 | 167.0 | 202.0 |

I, then, have prepared resinous polyamidoximes containing from 8.5% to 57% by weight of amidoxime substituents. However, in the case of cyanoethylated cellulose, the practical limit is about 6% nitrogen introduced. Hence, if this nitrogen which is about 12% nitrile groups is completely converted to amidoxime, a maximum of about 25% by weight of amidoxime substituents can be introduced into the cellulose polymer. The preceding figures are obviously not absolute limits of operability since samples somewhat lower or some higher in amidoxime content can be prepared and used. Hence, material containing as little as 5.0% or even considerably less, or as much as 60% by weight of amidoxime substituents depending upon the nature of the polymer would be operable and within the scope of my invention. However, to assure a material which is not appreciably acid sensitive during its use and regeneration, an amidoxime content of about 5.0% to about 25% by weight is preferred. Of course, if a cross-linked polymer is used, then a material containing up to 60% by weight of amidoxime substituents may be used in contact with acids without fear of acid sensitivity.

There are many examples of the resinous materials described above available in fibrous form to serve as a substrate for the preferred embodiment of this invention. Several so-called acrylic fibers are available in commercial or semi-commercial scale. These are all, save one, based upon acrylonitrile. The exception is based upon vinylidene cyanide and is a perfectly satisfactory alternative. Also, there is the much publicized cyanoethylated cotton. I have prepared cyanoethylated viscose rayon and also cyanoethylated polyvinyl alcohol fiber from Japanese insolubilized polyvinyl alcohol fiber, trade-named "Kuralon." The fibers listed below are all satisfactory for conversion to fibrous polyamidoximes. The percents are percents by weight except where indicated otherwise.

| Fiber | Treatment, if any | Composition |
|---|---|---|
| Orlon | None | >90% acrylonitrile. |
| Acrilan | do | Do. |
| Creslan | do | 95–96% acrylonitrile. |
| Zefran | do | >90% acrylonitrile. |
| Verel | do | About 50% acrylonitrile. |
| Dynel | do | 40% acrylonitrile, 60% vinyl chloride. |
| Darlan | do | 50 mole percent vinylidene cyanide, 50 mole percent vinyl acetate. |
| Cotton | Cyanoethylated | 21.7% acrylonitrile. |
| Viscose | do | 26.2% acrylonitrile. |
| Kuralon | do | 20.4% acrylonitrile. |

The detailed compositions of a few additional and typical acrylonitrile polymers which are satisfactory for the production of my polyamidoximes are listed as follows. The percents are percents by weight of each monomer in the polymer.

90% acrylonitrile–10% vinylacetonitrile
50% acrylonitrile–50% methacrylonitrile
97% acrylonitrile–3% vinyl acetate
50% acrylonitrile–50% vinyl acetate
95% acrylonitrile–5% methyl methacrylate
65% acrylonitrile–35% methyl acrylate
45% acrylonitrile–10% methyl acrylate–45% vinyl acetate
44% acrylonitrile–44% vinyl chloride–12% methyl acrylate
93% acrylonitrile–7% 2-vinyl pyridine
26% acrylonitrile–74% butadiene
40% acrylonitrile–60% butadiene (A)
33% acrylonitrile–67% styrene (B)
100% acrylonitrile (C)

A detailed description of the procedures using the last three polymers is given below. The process for preparing the polyamidoxime is very straightforward and it is not necesary to vary it greatly from sample to sample. Other useful polyamidoximes are described in Belgian Patent No. 541,496.

In examples I to XIV a closed system was used, i.e., the reflux condenser was capped to prevent loss of the volatile hydroxylamine.

*Example I*

*Amidoxime of polyacrylonitrile (C in table above).*—40 grams of powdered polyacrylonitrile were added to 750 cc. of a methanolic solution of hydroxylamine. The solution contained 0.048 g. $NH_2OH$ per cubic centimeter. The mixture was allowed to reflux for 10 hours, then cooled and the solvent removed by filtration. On a basis of the amount of hydroxylamine which was reacted, about 40% of the acrylonitrile substituents were converted to amidoxime. This is equal to 35.7% amidoxime based on the final resin weight. This powder, shaken with a dilute solution of copper sulfate immediately discharged the blue color and itself turned a deep green. The residual copper in the solution was determined by analysis to be 0.2 p.p.m. of solution. The powder also strongly chelated uranium and gold. Analysis (gain in weight and ash content) showed that it combined with more than 60% of its weight of uranium.

The amidoxime is a strongly basic group and this sample of uncross-linked polyacrylonitrile in its finely powdered form was easily and relatively completely converted to a polyamidoxime which was soluble in strong mineral acid. Upon reprecipitation with alkali it seemed to be unchanged in chelating power. This demonstrated that these polyamidoximes are relatively stable chemical entities and can go through this solution and regeneration without chemical breakdown.

Solubility of the polymer in acid would frequently be undesirable but it is easily avoided by moderating the conditions of reaction, e.g., by using a lower temperature, a shorter reaction time, a lower concentration of hydroxylamine, by using a granulated resin rather than a powder (alcohol and water do not swell polyacrylonitrile appreciably and hence hydroxylamine will not penetrate and react with as much polymer as in the case of the powder) or by using a copolymer containing some non-nitrile and therefore non-convertible monomer. A cross-linked copolymer would obviously be satisfactory. The acrylic fibers, even when almost 100% homopolymers of acrylonitrile are so highly oriented and impervious to solvents that conversion to the extent of acid solubiltiy is easily avoided.

*Example II*

*Acrylonitrile styrene copolymer (resin B of preceding table).*—A commercially available acrylonitrile-styrene copolymer containing 33% acrylonitrile and 67% styrene by weight was converted to the polyamidoxime as follows: The resin was obtained as cubes about one quarter inch in each dimension. These cubes were crushed in a mortar to about ten mesh size. 25 g. of this granulated resin were added to 500 cc. of an aqueous solution of hydroxylamine and held at 90° C. for 24 hours while being gently agitated. The solution contained 0.06 gram of hydroxylamine per cc. and was prepared by neutralizing an aqueous solution of hydroxylamine sulfate with an equivalent amount of sodium hydroxide. The sodium sulfate formed remained in the solution. After the 24 hour treatment the granules were removed from the solution, washed with cold water and dried. The hydroxylamine consumed indicated a conversion of about 20% of the nitrile groups and a final amidoxime content of 7.1% by weight of the resin. It successfully extracted the color from dilute solutions of copper sulfate, uranium acetate and gold chloride.

I have used methanolic solutions of hydroxylamine for most of my work because methanol is a good solvent for hydroxylamine and its salts and because the boiling point of methanol which is 65° C. is a convenient automatic temperature control. I have also used ethanol and isopropanol with equivalent results. Other alcohols may be used but the solubility of hydroxylamine salts rapidly diminishes as the alcohol increases in molecular weight. The reaction seems to be very slightly slower in water but the final product is as good as that formed using alcohol.

*Example III*

*Acrylonitrile butadiene copolymer (resin A of preceding table).*—A commercially available acrylonitrile-butadiene copolymer containing 40% acrylonitrile and 60% butadiene in crumb form was converted to the amidoxime as follows: 25 g. of the soft granular material were heated in 500 cc. of an aqueous solution of hydroxylamine containing 0.04 g. of hydroxylamine per cc. The mixture was held at 55° C. for 24 hours. At the end of this time the resin was removed from the liquid, washed with water and dried. The hydroxylamine consumed indicated a conversion of 25% of the nitrile groups and a final amidoxime content of 10.9% by weight. The resin successfully extracted the color from dilute aqueous solution of copper sulfate, uranium acetate and gold chloride.

The amidoximes of the intrile containing resins in fibrous form were prepared in a very similar manner except that care had to be exercised to prevent damage to the fibers. Very gentle conditions were necessary with some of the thermoplastic synthetic fibers.

*Example IV*

*The amidoxime of cyanoethylated cotton.*—142 g. of cyanoethylated cotton flannel (5.7% N) were immersed in 1480 cc. of a methanolic solution of hydroxylamine. The solvent was refluxed for 23 hours. The cloth was then removed, washed with water and dried. The cotton was not damaged and essentially unchanged in hand. The hydroxylamine consumed indicated an amidoxime content of 9.3% of the final weight of the modified cotton. Samples of it removed most of the gold, uranium and copper from dilute solutions of these metals by a simple filtration step. The solutions were merely slowly filtered through the treated cloth.

Example V

*The amidoxime of an acrylic fiber (Zefran).*—8.6 grams of Zefran fabric (a light weight twill) were immersed in 376 cc. of a 0.045 g. $NH_2OH$/cc. solution in methanol. The mixture was refluxed for ten hours. The cloth was then removed, washed with water and dried. The hydroxylamine consumed indicated an amidoxime content of 9.7% by weight. As with the cotton derivative, this cloth strongly chelated a number of heavy metals.

The following examples, set forth in tabular form, were carried out in the same manner as indicated in the preceding examples. As previously indicated, all preparations were carried out in a closed system.

diameter of a cotton fiber. This means that fibers ten times as coarse as cotton (.20 mm.) are equivalent to the surface area of commercial resins. Thus, cotton is ten times better as to surface-volume ratio than the commercial ion exchange resins. Therefore, by passing a liquid through one or more layers of a textile fabric amidoxime, I achieve surface contact equivalent to what would be realized by the very, very slow percolation of the liquid through a bed of extremely fine resin.

Hence, the fibrous polyamidoximes offer a greatly improved speed or throughput over any other form. Fibrous amidoximes, because of the speed with which liquid can pass through them with effective contact and because of the efficiency with which the amidoxime groups selectively extract metals, make it possible to selectively recover mineral values from very large volumes of extremely dilute solutions. The fabric polyamidoximes have the further advantage that they are self-supporting structures. They may take the form of a filter cloth, in any geometrical form, e.g., rectangular or circular; they may be

| Ex. | Original fiber | Mole ratio [a] $NH_2OH$/fabric | Gms. fabric | Gms. $NH_2OH$ | $NH_2OH$[b] conc., g./cc. | Time, hours | Temp., °C. | Hand | Gms. $NH_2OH$ reacted | Amidoxime, percent by weight of the fiber |
|---|---|---|---|---|---|---|---|---|---|---|
| VI | Acrilan | 4.35:1 | 5.3 | 14.3 | .032 | 1 | 65 | Very sl. stiff | .19 | 8.0 |
| VII | Cotton (print) cyanoethylated | 2.8:1 | 64.0 | 23.9 | .035 | 18 | 65 | do | 3.35 | 8.5 |
| VIII | Creslan | 2.16:1 | 1.6 | 2.2 | .023 | 0.5 | 65 | Sl. stiffening | .11 | 12.3 |
| IX | Darlan | 2.0:1 | 2.5 | 4.5 | .055 | 2 | 25 | do | .19 | 13.7 |
| X | Dynel | 2.0:1 | 8.0 | 10.0 | .023 | 1.5 | 50 | No change | .38 | 8.6 |
| XI | Orlon | 2.4:1 | 3.6 | 5.4 | .023 | 4 | 65 | Sl. yellow | .20 | 10.0 |
| XII | Verel | 2.0:1 | 6.3 | 7.88 | .023 | 1.5 | 50 | Sl. stiffening | .39 | 11.0 |
| XIII | Zefran | 4.0:1 | 6.8 | 16.9 | .045 | 4 | 50 | Very sl. stiff | .34 | 8.9 |
| XIV | Dynel paper | 4.3:1 | 6.0 | 16.1 | .042 | 5 | 62 | No change | .29 | 8.5 |

[a] A molecular weight of 246 was used for the cyanoethylated cotton cloth (based on N content of 5.7%). The acrylic fibers were assumed to be polymers of acrylonitrile and a molecular weight of 53 was used.
[b] This involves an excess of $NH_2OH$ over the polymer and particularly where part of the polymer is derived from a non-convertible comonomer.

Although I have concentrated my studies on fabrics, I have also studied fibers. I have found that the fibers behave exactly as the fabrics made from the fibers. The conversion of the nitrile group to amidoxime can be effected in a manner similar to the preceding examples on fibers and yarns as well as on the non-woven fabrics obtained from these fibers and yarns.

Also, I have found that these polyamidoximes in granular or powder form are effective and useful for the extraction of heavy metals. However, as previously set forth, the polyamidoximes in fibrous form are a particularly preferred embodiment. Fibers, i.e., normal textile fibers, are equivalent to very fine powders in two of their three dimensions and the surface area per unit volume offered by such fibers is almost equal to that of powders of the same diameter. A high surface area per unit volume is, of course, a very desirable feature of any solid intended for the treatment of liquids. A simple calculation shows how fibers and spherical resin granules compare. Neglecting the ends, which shortcut penalizes the fibers very slightly, the ratio of surface area to volume is 4 over $d$ for fibers and 6 over $d$ for spheres. In other words, a fiber is equivalent to a sphere of 50% greater diameter and the following relationship exists between fibers and equivalent spherical resin granules.

| Fiber diameter, mm. | Sphere | |
|---|---|---|
|  | Diameter, mm. | Mesh-size |
| .02 | .03 | −325 |
| .04 | .06 | −230 |
| .09 | .12 | −120 |
| .20 | .30 | − 50 |

A 50 mesh resin (0.30 mm. diameter) is the finest which is practicable and .02 mm. is the average mean mounted upon a frame or be formed into a sleeve or sack of any size or shape.

The temperatures employed during my selective extraction and elution processes are not critical. Since the solid polyamidoxime whether in the form of granules, fibers, fabrics, etc., is stable up to about 125° C., I may use temperatures up to such values. Of course, lower temperatures, even down to the freezing point of the solutions may be used. In other words, the temperature of the materials, which is usually room temperature, was found to be convenient. Of course, in industrial processes, the temperature of the liquid bodies to be treated may be above or below room temperature; but as stated above, these temperatures are not critical.

In addition to aqueous media including water as well as such commodities as beer, wines, milk, etc., my process may be carried out in non-aqueous media, e.g., methanol, ethanol, acetone or any solvent which will dissolve traces of metal salts.

SELECTIVE EXTRACTION

The following seven examples illustrate the selective removal and subsequent recovery of iron from aqueous solutions containing said iron in admixture with (a) other chelatable heavy metal ions and (b) non-chelatable metal ions. In each example, a solution was prepared by dissolving a sufficient amount of salt of the desired metal to supply the indicated number of grams of metal per 100 cc. of final volume which includes the volume of the acid solution needed to adjust the pH. The pH of the solution was adjusted to the given value by addition of hydrochloric acid. Then, a 4 gram woven polyamidoxime fabric prepared in accordance with Example V was immersed into each of the 100 cc. solutions containing the mixtures of metal ions. The large quantities of polyamidoxime chelator fabric were used to assure excess chelating capacity and to enhance the extraction of the second metal if it had a tendency to complex. After the fabric and solution were in contact for 8 hours at room temperature, the fabric was removed and carefully washed free of any original solution which may have been mechanically held to the fabric. The metal ions which are chelated to the fabric were eluted therefrom by immersing the fabric in a 100 cc. solution containing 5% by weight of hydrochloric acid (pH <1). The metal content which was freed from the fabric in this manner was determined by standard analytical procedures.

*Example XV*

INITIAL SOLUTION (pH=1.92)

| Salt | Cation | Gms. cation |
|---|---|---|
| Ferric chloride | Iron | 0.110 |
| Uranyl acetate | Uranium | 0.010 |

REMOVED CATIONS (BY CHELATION)

| Cation | Gms. cation | Percent by weight of cation |
|---|---|---|
| Iron | 0.100 | 91 |
| Uranium | 0.00 | 0 |

*Example XVI*

INITIAL SOLUTION (pH=2.0)

| Salt | Cation | Gms. cation |
|---|---|---|
| Ferric chloride | Iron | 0.050 |
| Uranyl acetate | Uranium | 0.500 |

REMOVED CATIONS (BY CHELATION)

| Cation | Gms. cation | Percent by weight of cation |
|---|---|---|
| Iron | 0.050 | 100 |
| Uranium | 0.001 | 2 |

*Example XVII*

INITIAL SOLUTION (pH=2.5)

| Salt | Cation | Gms. cation |
|---|---|---|
| Ferric chloride | Iron | 0.0112 |
| Nickel(ous) chloride | Nickel | 0.100 |
| Aluminum nitrate | Aluminum | 0.500 |
| Calcium chloride | Calcium | 0.500 |
| Sodium chloride | Sodium | 0.500 |

REMOVED CATIONS (BY CHELATION)

| Cation | Gms. cation | Percent by weight of cation |
|---|---|---|
| Iron | 0.011 | 98 |
| Nickel | 0.0 | 0 |
| Aluminum | 0.0 | 0 |
| Calcium | 0.0 | 0 |
| Sodium | 0.0 | 0 |

*Example XVIII*

INITIAL SOLUTION (pH=3.0)

| Salt | Cation | Gms. cation |
|---|---|---|
| Ferric chloride | Iron | 0.0122 |
| Manganous acetate | Manganese | 0.100 |
| Aluminum nitrate | Aluminum | 0.500 |
| Calcium chloride | Calcium | 0.500 |
| Sodium chloride | Sodium | 0.500 |

REMOVED CATIONS (BY CHELATION)

| Cation | Gms. cation | Percent by weight of cation |
|---|---|---|
| Iron | 0.011 | 91 |
| Manganese | 0.0 | 0 |
| Aluminum | 0.0 | 0 |
| Calcium | 0.0 | 0 |
| Sodium | 0.0 | 0 |

*Example XIX*

INITIAL SOLUTION (pH=3.02)

| Salt | Cation | Gms. cation |
|---|---|---|
| Ferric chloride | Iron | 0.0155 |
| Chromic nitrate | Chromium | 0.100 |

REMOVED CATIONS (BY CHELATION)

| Cation | Gms. cation | Percent by weight of cation |
|---|---|---|
| Iron | 0.0147 | 95 |
| Chromium | 0.010 | 10 |

*Example XX*

INITIAL SOLUTION (pH=3.5)

| Salt | Cation | Gms. cation |
|---|---|---|
| Ferric chloride | Iron | 0.063 |
| Barium chloride | Barium | 0.100 |

REMOVED CATIONS (BY CHELATION)

| Cation | Gms. cation | Percent by weight of cation |
|---|---|---|
| Iron | 0.063 | 100 |
| Barium | 0.0 | 0 |

*Example XXI*

INITIAL SOLUTION (pH=2.0)

| Salt | Cation | Gms. cation |
|---|---|---|
| Ferric chloride | Iron | 0.055 |
| Uranyl acetate | Uranium | 0.054 |

REMOVED CATIONS (BY CHELATION)

| Cation | Gms. cation | Percent by weight of cation |
|---|---|---|
| Iron | 0.054 | 98 |
| Uranium | 0.0 | 0 |

The following seven examples were also carried out in accordance with the procedure employed in the preceding seven examples.

*Example XXII*

INITIAL SOLUTION (pH=2.9)

| Salt | Cation | Gms. cation |
|---|---|---|
| Cupric sulfate | Copper | 0.100 |
| Uranyl acetate | Uranium | 0.110 |

REMOVED CATIONS (BY CHELATION)

| Cation | Gms. cation | Percent by weight of cation |
|---|---|---|
| Uranium | 0.110 | 100 |
| Copper | 0.009 | 9 |

Example XXIII

INITIAL SOLUTION (pH=3.5)

| Salt | Cation | Gms. cation |
|---|---|---|
| Cupric acetate | Copper | 0.180 |
| Nickel(ous) chloride | Nickel | 0.099 |

REMOVED CATIONS (BY CHELATION)

| Cation | Gms. cation | Percent by weight of cation |
|---|---|---|
| Copper | 0.162 | 90 |
| Nickel | 0.005 | 5 |

Example XXIV

INITIAL SOLUTION (pH=1.9)

| Salt | Cation | Gms. cation |
|---|---|---|
| Chlorauric acid | Gold | 0.100 |
| Lead acetate | Lead | 0.100 |

REMOVED CATIONS (BY CHELATION)

| Cation | Gms. cation | Percent by weight of cation |
|---|---|---|
| Gold | 0.100 | 100 |
| Lead | 0.0 | 0 |

Example XXV

INITIAL SOLUTION (pH=4.05)

| Salt | Cation | Gms. cation |
|---|---|---|
| Uranyl acetate | Uranium | 0.100 |
| Lead acetate | Lead | 0.100 |

REMOVED CATIONS (BY CHELATION)

| Cation | Gms. cation | Percent by weight of cation |
|---|---|---|
| Uranium | 0.099 | 99 |
| Lead | 0.00 | 0 |

Example XXVI

INITIAL SOLUTION (pH=3.46)

| Salt | Cation | Gms. cation |
|---|---|---|
| Uranyl acetate | Uranium | 0.100 |
| Thorium chloride | Thorium | 0.100 |

REMOVED CATIONS (BY CHELATION)

| Cation | Gms. cation | Percent by weight of cation |
|---|---|---|
| Uranium | 0.099 | 99 |
| Thorium | 0.005 | 5 |

Example XXVII

INITIAL SOLUTION (pH=3.26)

| Salt | Cation | Gms. cation |
|---|---|---|
| Uranyl acetate | Uranium | 0.100 |
| Zinc acetate | Zinc | 0.100 |

REMOVED CATIONS (BY CHELATION)

| Cation | Gms. cation | Percent by weight of cation |
|---|---|---|
| Uranium | 0.100 | 100 |
| Zinc | 0.0 | 0 |

Example XXVIII

INITIAL SOLUTION (pH=3.16)

| Salt | Cation | Gms. cation |
|---|---|---|
| Uranyl acetate | Uranium | 0.100 |
| Stannous chloride | Tin | 0.100 |

REMOVED CATIONS (BY CHELATION)

| Cation | Gms. cation | Percent by weight of cation |
|---|---|---|
| Uranium | 0.099 | 99 |
| Tin | 0.0 | 0 |

Example XXIX

*Recovery of copper from a cuprammonium complex.*—0.391 g. of cupric sulfate, $CuSO_4 \cdot 5H_2O$, and 0.445 g. of manganese acetate, $Mn(C_2H_3O_2)_2 \cdot 4H_2O$, were dissolved in 100 cc. of distilled water and an approximately one cc. of a concentrated solution of ammonium hydroxide was added to develop the strong cuprammonium blue color. This indicated the presence of the cuprammonium cation, $Cu(NH_3)_4^{+2}$. The above solution thus contained:

|  | G. |
|---|---|
| Copper | 0.100 |
| Manganese | 0.100 | and had a pH of 8.3. A small sample of a fibrous polyamidoxime was immersed in the solution and allowed to stand at room temperature for two hours. During this time, the solution became colorless and the fabric turned greenish black. However, this color was observed not to be the same as the bright green color of a copper chelate complex formed in the absence of ammonia. Hence, it may be concluded that chelation occurred between the amidoxime groups and the cuprammonium anion. However, on elution with acid, the free copper ion was recovered. The fabric was removed, washed, dried and ashed. The ash showed no manganese. The original solution after fabric was removed showed 9 parts per million of copper. This indicated an essentially quantitative recovery of copper in the presence of ammonia. A second chelated sample prepared in the same manner was eluted with 5% by weight aqueous solution of sulfuric acid. The eluate showed the usual light blue color of the hydrated cupric ion.

The fibrous polyamidoxime of the above Example XXIX was prepared according to the directions of Example V, but on a much larger scale. Twenty-five yards of a Zefran shirting fabric were treated for 4 hours at 60° C. in a commercial dye beck containing 6650 grams of hydroxylamine hydrochloride in 55 gallons of water. 5800 grams of potassium hydroxide were also present to free the hydroxylamine from its hydrochloride salt. The cloth was then removed, washed with water and dried.

The fabric showed 2.4% by weight of oxime nitrogen content, i.e., almost exactly equivalent to the 9.7% by weight amidoxime content of the material of Example V.

The following examples demonstrate the excellent capacity of the chelating materials. In each example the fibrous chelator of Example XXIX was immersed in a solution containing a 100% excess of the metal ion to be extracted. The excess was determined by assuming a 1 to 1 combination of the amidoxime functional group and the metal ion. The fabric, as stated previously, showed by analysis 2.4% by weight of oxime nitrogen or 0.161 atom percent of oxime nitrogen. If each amidoxime group joined one metal atom, the number of atoms of oxime nitrogen equal the number of atoms of metal. The metal content at saturation should therefore be 0.161 multiplied by the atomic weight of the metal. Also in each example the extraneous nonchelatable metal cations, lead, aluminum, and barium were each present in amounts of 0.100 gram to demonstrate selectivity and non-interference as well as the capacity of the fabric. The example directed to the extraction of uranium is given in detail (Example XXX). The other examples were carried out in the same manner and are summarized in the table following Example XXX. In each instance, the metal to be chelated was present in an amount exactly twice the calculated capacity of the fabric sample used and ions of lead, aluminum and barium were each present in amounts of 0.100 gram. The pH which is disclosed in each example represents the value which resulted from upward adjustment to promote chelation, downward adjustment to clarify the heavy metal solution, or the natural pH of the salt mixture.

*Example XXX*

A 400 cc. solution was prepared by dissolving the following salts in sufficient amounts to yield the indicated quantities of the heavy metal ions. After solution of the salts the pH was adjusted to 5.5 by addition of a few drops of a 10% by weight aqueous solution of sodium hydroxide. The total volume after adjusting the pH was 400 cc.

| Ion | Weight of ion (gms.) | Salt |
|---|---|---|
| Uranium | 0.400 | $UO_2(C_2H_3O_2)_2 \cdot 2H_2O$ |
| Lead | 0.100 | $Pb_3(C_2H_3O_2)_3OH$ |
| Aluminum | 0.100 | $Al(NO_3)_3 \cdot 9H_2O$ |
| Barium | 0.100 | $BaCl_2 \cdot 2H_2O$ |

To the above solution, 0.5164 gram of the fibrous polyamidoxime was immersed in the solution. After immersion in the solution overnight at room temperature, during which time the fabric turned a strong bright orange color, the fabric was removed, washed thoroughly with distilled water, dried and ashed. The ash was analyzed for the four metals. The analysis indicated 39% by weight of uranium based upon the original fabric weight, a trace of barium, no aluminum and no lead.

In the above examples, in no instance was more than a hardly measurable trace of lead, barium or aluminum found. Most of the tests for these metals were entirely negative.

The full 1:1 pickup is not achieved in every instance, but is realized frequently enough to establish it as the true potential capacity. It is quite reasonable that not every metal is chelated to the same degree even among those which are chelated. It is possible that the metals above which show pickup appreciably less than the calculated capacities have less favorable distribution coefficients and a considerably higher concentration in the solutions would be necessary to fully load the fabric.

The pickup values clearly demonstrate the exceedingly high capacity of these polyamidoxime chelating agents when used in carrying out my process of selective extraction. The fabric used in the test is not the most highly converted, i.e., it contained 9.8% by weight of amidoxime substituents. Hence, with a higher conversion of nitrile substituents to amidoxime substituents, notably higher capacities can be achieved.

*Example XLIV*

A 4 gram sample of cyanoethylated cotton was immersed for 2 minutes in a 5% by weight solution of m-toluene diisocyanate (80% by weight 2,4-isomer and 20% by weight 2,6-isomer) in benzene. The resulting cross-linked fabric was then centrifuged, vacuum desiccated and heated at 110° C. for one hour. Then the fabric was washed with benzene, dried, soaked in water for four hours and finally dried. The total weight gain was found to be 0.221 gram.

The above cross-linked fabric was heated for 6 hours at 75° C. in an aqueous hydroxylamine solution containing 0.045 gram hydroxylamine per cc. of water. Thereafter the fabric which was a cross-linked polyamidoxime was water washed and dried.

A sample of the above fabric quantitatively removed the uranium present in an aqueous solution which contained 0.1% by weight of uranium present as uranyl acetate, 2% by weight of sodium present as sodium chloride and 2% by weight of calcium present as calcium chloride. The pH of the solution before treatment with the fabric was 4. The fabric was subsequently treated with a 1% by weight aqueous solution of hydrochloric acid in order to elute the uranium. No damage of the fabric was observed.

By comparison, a polyamidoxime prepared from cyanoethylated cotton, but not treated with m-toluene diisocyanate in order to introduce cross-linking, rapidly disintegrated and partially dissolved when contacted with the 1% hydrochloric acid solution.

*Example XLV*

A solution containing 0.035% by weight Fe present as ferric chloride
0.035% by weight Au present as chlorauric acid
0.035% by weight Cu present as copper chloride
0.035% by weight Ba present as barium chloride
0.035% by weight Al present as aluminum nitrate

| Ex. | Salt | Metal | Atomic weight | pH of sol. | Pick-up calculated (percent) | Pick-up actual (percent) | Percent of theory |
|---|---|---|---|---|---|---|---|
| XXXI | Vanadium sulfate | Vanadium | 51 | 3.9 | 8.4 | 8.4 | Ca. 100 |
| XXXII | Chromic nitrate | Chromium | 52 | 3.9 | 8.5 | 3.6 | 43 |
| XXXIII | Ferric chloride | Iron | 56 | 3.0 | 9.2 | 9.1 | Ca. 100 |
| XXXIV | Cobaltous nitrate | Cobalt | 59 | 5.5 | 9.7 | 3.7 | 38 |
| XXXV | Nickel(ous) chloride | Nickel | 59 | 5.9 | 9.7 | 3.0 | 31 |
| XXXVI | Cupric sulfate | Copper | 64 | 6.5 | 10.5 | 10.3 | Ca. 100 |
| XXXVII | Ruthenium chloride | Ruthenium | 101 | 2.2 | 16.6 | 4.4 | 27 |
| XXXVIII | Rhodium chloride | Rhodium | 103 | 3.4 | 16.9 | 16.3 | Ca. 100 |
| XXXIX | Palladium chloride | Palladium | 107 | 3.2 | 17.5 | 17.1 | Ca. 100 |
| XL | Platinic chloride | Platinum | 195 | 2.5 | 32.0 | 31.0 | Ca. 100 |
| XLI | Chlorauric acid | Gold | 197 | 2.0 | 32.4 | 32.0 | Ca. 100 |
| XLII | Thallium nitrate | Thallium | 204 | 4.6 | 34.2 | 6.5 | 19 |
| XLIII | Uranium acetate | Uranium | 238 | 5.5 | 39.2 | 39.0 | 100 | was prepared. The pH as prepared was found to be 3.5. It was adjusted downward to about 2.5 by the addition of a few drops of hydrochloric acid. A 2 gram sample of the polyamidoxime fabric of Example XXIX was allowed to stand in the solution overnight. The solution turned bluish and the fabric brown. The fabric which had chelated both the gold and iron ions was washed with water and then soaked in a 5% HCl solution for a few minutes. The fabric was washed again and ignited. The ash accounted for all of the gold originally in the system. The ash also showed a trace of iron and no trace of copper or barium. The acid solution was analyzed for iron. It contained 93% of the iron originally added and 5% of the copper. The original solution which has been extracted once was adjusted to a pH of 6 by the addition of a 10% NaOH solution. A second piece of same polyamidoxime fabric was allowed to soak in this solution for two hours. It was then removed, washed and eluted with a 5% HCl solution. The eluate, upon analysis, showed a faint qualitative test for iron and none for gold. It contained 87% of the copper initially added.

The following three examples illustrate the practice of my invention in media other than water.

*Example XLVI*

A polyamidoxime fabric prepared from Zefran as described in Example XXIX was immersed at room temperature in a solution of methanol saturated with sodium acetate and copper sulfate. The fabric turned light blue which indicated copper pickup. The methanolic solution after treatment with the fabric gave no test for copper.

*Example XLVII*

A polyamidoxime fabric prepared from Zefran as described in Example XXIX was immersed at room temperature in a solution of ethanol saturated with zinc acetate and uranium acetate. The fabric turned pale yellow indicating uranium pickup. The fabric showed no zinc. The solution after treatment with the fabric gave no test for uranium.

*Example XLVIII*

A polyamidoxime fabric prepared from Zefran as described in Example XXIX was immersed at room temperature in a solution of ethanol saturated with zinc acetate and ferric chloride. The fabric turned brown. The solution after treatment with the fabric showed only a faint trace of iron. The fabric showed no zinc. The fabric was subsequently eluted by treatment with a small quantity of acid. The eluate was yellow and gave a very strong test for iron.

*Example XLIX*

0.1 gram of a fibrous polyamidoxime prepared from Zefran as described in Example XXIX was immersed in 25 cc. of a solution containing 0.0132 gram per liter plutonium nitrate (13.2 p.p.m.), 18.9 grams per liter of nitric acid and 51 grams per liter of aluminum (from aluminum nitrate). The pH was about 0.6. The fabric chelated 40% of the plutonium in one hour and 60% after standing overnight. Plutonium as indicated above appears to behave like the more common noble metals and is not eluted from the polyamidoxime by strong acid.

The polyamidoxime whether in the form of granules, fibers, yarns, woven or non-woven fabrics, etc., has many uses. A principal use is in the selective recovery of the metal ions in Table I from solutions containing same. The resulting chelated polyamidoxime in most instances may be eluted with acid to recover the metals. Moreover, in view of the exceedingly high capacities which may be achieved, the chelated polyamidoxime may be used as such. For instance, if the solid polyamidoxime is chelated with a mixture of the noble metals, for instance, about 25% to 35% by weight of such metals based on the total weight of the complex, it will serve as a relatively light weight and flexible radiation shield. Also, the solid polyamidoxime may serve as a catalyst carrier for reactions which are promoted by traces of mixtures of various heavy metals in amounts of, e.g., about 1% to 5% by weight of the metals based on the total weight of the complex. By use of polyamidoximes, catalyst carriers containing mixtures of metals in predetermined quantity and ratio may be prepared. In such system, the catalyst mixture is readily removed when no longer wanted. Of course, by the practice of my process of selective extraction, I may extract a single ion. In such cases, the polyamidoxime when extracted with a single ion may also be used as a radiation shield, e.g., when chelated with palladium, or as a catalyst carrier for reactions which are promoted by traces of a single metal such as copper and nickel. Also, whether chelated with a single radioactive metal isotope, e.g. $U_{235}$, or a plurality of radioactive metals, it will serve as an efficient neutron source which may be used as a fuel element in a reactor. For example, complexes of active uranium isotopes and fibrous polyamidoximes carrying from about 5% to about 40% by weight of uranium, based on the total weight of the complex, are extremely useful especially because of the efficient utilization of the neutrons. The disintegrating atoms are essentially on the surface of the material. There is no external layer of extraneous material to slow or absorb the neutrons. Thus, the neutrons are essentially 100% available for triggering chemical reactions or transmutation changes. In the form of a fabric, the uranium complexed polyamidoxime is much superior to an extremely thin sheet of uranium or uranium oxide. Such a metal or oxide sheet of one of the active isotopes would be difficult and dangerous to fabricate and would be very feeble. The fabric is quite strong and all the operations needed to prepare the fabric take place before the dangerous radioactive isotope is added. The fabric is also easily deformable to yield desired structures and shapes. Furthermore, a mass of fibers carrying one of the radioactive isotopes is readily permeable to gases and liquids which are to be altered by the energy of the radioactive change. Thus, when used as fuel elements, an activated source of energy is supplied for purposes of sterilization, reaction between chemicals, etc.

It must be appreciated that many modifications within the scope of the present invention will occur to those skilled in the art. For instance, a single metal or various combinations of the metals selected from Table I may be extracted from mixtures of the metals of Table I, alone or in admixture with the ions of the unextractable metals. Also, a single ion from Table I in admixture with one or several of the unextractable metals may be recovered. Similarly, a polyamidoxime which has been chelated with a mixture of several of the metals selected from Table I, may be selectively eluted by adjustment of the pH so that the ions may be, if desired, separated from the polyamidoxime. Also, my process is admirably adapted for continuous use from the standpoint of selective extraction, selective elution and regeneration of the polyamidoxime. For instance, a mechanically driven endless belt comprising a solid polyamidoxime fabric may be continuously passed through a plurality of tanks which may contain, in series, the solution to be treated, a washing tank, an acid tank for elution and regeneration, a further washing tank, etc. Each tank may be connected to both filling and emptying means, which means may be regulated in their operation in a timed relationship with the travel of the endless belt.

This application is a continuation-in-part of my copending application, Serial No. 673,157, filed July 22, 1957, now abandoned.

Having described my invention, what I claim as new and desire to secure by Letters Patent is:

1. A process for selectively extracting at least one polyvalent metal selected from the group consisting of:

|  | pH |
|---|---|
| Plutonium | <1 |
| Gold | <1 |
| Platinum | <1 |
| Palladium | <1 |
| Rhodium | About 1.0 |
| Iron | About 1.5 |
| Thallium | About 1.5 |
| Vanadium | About 1.5 |
| Uranium | About 2.0 |
| Ruthenium | About 2.0 |
| Copper | About 3.5 |
| Nickel | About 4.0 |
| Cobalt | About 4.0 |
| Chromium | About 4.0 | from a solution comprising
(1) at least one of said metals and
(2) at least one other metal selected from the group consisting of
   (a) at least one of said metals and
   (b) the remaining metals of the periodic chart of the elements so that at least one metal remains in solution comprising the steps of bringing said solution into contact with a solid, solvent insoluble polyamidoxime at a pH not numerically lower than the numerical value set forth above and not greater than the pH at which said metal precipitates out of solution whereby said metal reacts with the amidoxime radicals of said polyamidoxime to form a chelate structure therewith and thereafter separating the resulting chelated solid polyamidoxime from said solution.

2. The process of claim 1 in which said polyamidoxime is a polymer containing from about 5.0% to about 60% by weight of amidoxime substituents.

3. The process of claim 1 in which said polyamidoxime is a high molecular weight organic nitrile containing polymer selected from the group consisting of a polymer of acrylonitrile, a polymer of vinylidine cyanide, cyanoethylated cellulose and derivatives thereof and cyanoethylated polyvinyl alcohol, said polymer having at least some of said nitrile radicals converted to amidoxime radicals.

4. A process for selectively extracting from at least one polyvalent metal up to one less than the total number of polyvalent metals selected from the group consisting of:

| | |
|---|---|
| Plutonium | Vanadium |
| Gold | Uranium |
| Platinum | Ruthenium |
| Palladium | Copper |
| Rhodium | Nickel |
| Iron | Cobalt |
| Thallium | Chromium | from a solution comprising at least two polyvalent metals selected from the group consisting of:

|  | pH |
|---|---|
| Plutonium | <1 |
| Gold | <1 |
| Platinum | <1 |
| Palladium | <1 |
| Rhodium | About 1.0 |
| Iron | About 1.5 |
| Thallium | About 1.5 |
| Vanadium | About 1.5 |
| Uranium | About 2.0 |
| Ruthenium | About 2.0 |
| Copper | About 3.5 |
| Nickel | About 4.0 |
| Cobalt | About 4.0 |
| Chromium | About 4.0 | which comprises the steps of bringing a solid, solvent-insoluble polyamidoxime into contact with said solution at a pH not numerically lower than the numerical value set forth above and not greater than the pH at which said metal precipitates out of solution, whereby said metal reacts with the amidoxime radicals of said polyamidoxime to form a chelate structure therewith and thereafter separating the resulting chelated solid polyamidoxime from said solution.

5. A process for selectively extracting at least one polyvalent metal selected from the group consisting of:

| | |
|---|---|
| Plutonium | Vanadium |
| Gold | Uranium |
| Platinum | Ruthenium |
| Palladium | Copper |
| Rhodium | Nickel |
| Iron | Cobalt |
| Thallium | Chromium | from a solution comprising at least one polyvalent metal selected from the group consisting of:

|  | pH |
|---|---|
| Plutonium | <1 |
| Gold | <1 |
| Platinum | <1 |
| Palladium | <1 |
| Rhodium | About 1.0 |
| Iron | About 1.5 |
| Thallium | About 1.5 |
| Vanadium | About 1.5 |
| Uranium | About 2.0 |
| Ruthenium | About 2.0 |
| Copper | About 3.5 |
| Nickel | About 4.0 |
| Cobalt | About 4.0 |
| Chromium | About 4.0 | plus at least one other metal of the remaining metals of the periodic chart of the elements which comprises the steps of bringing a solid, solvent insoluble polyamidoxime into contact with said solution at a pH not numerically lower than the numerical value set forth above and not greater than the pH at which said metal precipitates out of solution, whereby said metal reacts with the amidoxime radicals of said polyamidoxime to form a chelate structure therewith and thereafter separating the resulting solid chelated polyamidoxime from said solution.

6. A process for selectively extracting a polyvalent metal selected from the group consisting of:

|  | pH |
|---|---|
| Plutonium | <1 |
| Gold | <1 |
| Platinum | <1 |
| Palladium | <1 |
| Rhodium | About 1.0 |
| Iron | About 1.5 |
| Thallium | About 1.5 |
| Vanadium | About 1.5 |
| Uranium | About 2.0 |
| Ruthenium | About 2.0 |
| Copper | About 3.5 |
| Nickel | About 4.0 |
| Cobalt | About 4.0 |
| Chromium | About 4.0 | from a solution comprising mixtures of polyvalent metals selected from the group consisting of:
(1) at least two of said metals, and
(2) at least one of said metals plus at least one other metal of the remaining metals of the periodic chart of the elements which comprises the steps of bringing a solid, insoluble polyamidoxime into contact with said solution at a pH not numerically lower than the numerical value set forth above and not greater than the pH at which said metal precipitates out of solution, whereby said metal reacts with the amidoxime radicals of said polyamidoxime to form a chelate structure therewith and thereafter separating the resulting chelated solid polyamidoxime from said solution.

7. The process of claim 6 in which said polyvalent metal is uranium and said pH is not numerically lower than about 2.0 and not greater than the pH at which said uranium precipitates out of solution.

8. The process of claim 6 in which said polyvalent metal is plutonium and said pH is not numerically lower than <1 and not greater than the pH at which said plutonium precipitates out of solution.

9. A process for selectively extracting iron from an aqueous solution comprising a mixture of iron and uranium which comprises the steps of bringing said solution into contact with a solid, solvent insoluble polyamidoxime at a pH numerically below about 2.0 and numerically above about 1.5 whereby said iron reacts with the amidoxime radicals of said polyamidoxime to form a chelate structure and thereafter separating the resulting chelated solid polyamidoxime from the solution.

10. A process for selectively extracting iron from an aqueous solution comprising a mixture of iron and nickel which comprises the steps of bringing said solution into contact with a solid, solvent insoluble polyamidoxime at a pH numerically below about 4.0 and numerically above about 1.5 whereby said iron reacts with the amidoxime radicals of said polyamidoxime to form a chelate structure and thereafter separating the resulting chelated solid polyamidoxime from the solution.

11. A process for selectively eluting at least one polyvalent metal up to one less than the total number of polyvalent metals selected from the group consisting of:

|           | pH       |
|-----------|----------|
| Rhodium   | About 1.0 |
| Iron      | About 1.5 |
| Thallium  | About 1.5 |
| Vanadium  | About 1.5 |
| Uranium   | About 2.0 |
| Ruthenium | About 2.0 |
| Copper    | About 3.5 |
| Nickel    | About 4.0 |
| Cobalt    | About 4.0 |
| Chromium  | About 4.0 | which is chelated with a solid, solvent insoluble polyamidoxime comprising the steps of bringing said chelated solid, solvent insoluble polyamidoxime into contact with a solution at a pH not numerically greater than the numerical value set forth above for said metals to be eluted so that at least from one of said metals up to one less than the total number of said metals is freed from its complex with said polyamidoxime and enters said solution and thereafter separating the solid polyamidoxime from the resulting metal enriched solution.

12. A solid, solvent insoluble polyamidoxime complexed with at least two polyvalent metals selected from the group consisting of:

| Plutonium | Vanadium |
| Gold | Uranium |
| Platinum | Ruthenium |
| Palladium | Copper |
| Rhodium | Nickel |
| Iron | Cobalt |
| Thallium | Chromium |

13. The complexed composition of claim 12 in which said polyamidoxime contains from about 5% to about 60% by weight of amidoxime substituents.

14. The complexed composition of claim 12 in which said polyamidoxime is a high molecular weight organic nitrile containing polymer selected from the group consisting of a polymer of acrylonitrile, a polymer of vinylidine cyanide, cyanoethylated cellulose and derivatives thereof and cyanoethylated polyvinyl alcohol, said polymer having at least some of said nitrile radicals converted to amidoxime radicals.

References Cited in the file of this patent
UNITED STATES PATENTS

| 2,812,233 | Lewis | Nov. 5, 1957 |
| 2,902,514 | Benneville et al. | Sept. 1, 1959 |
| 2,909,542 | Soloway | Oct. 20, 1959 |
| 2,933,475 | Hoover et al. | Apr. 19, 1960 |

OTHER REFERENCES

Chem. Abs., vol. 45, 5572(i) (1951).

Martell and Colvin: "Chemistry of the Metal Chelate Compounds," 446–49, 468–69 (1952), Prentice-Hall Inc., New York.

Martell et al.: Cited, paper No. 2, pages 433–445, 450–467.